(12) United States Patent
Blard et al.

(10) Patent No.: US 6,253,897 B1
(45) Date of Patent: Jul. 3, 2001

(54) CLUTCH MECHANISM COMPRISING A WEAR TAKE-UP MODULE

(75) Inventors: Michel Blard, Issy-les-Moulineaux; Michel Graton, Paris, both of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/402,395
(22) PCT Filed: Feb. 5, 1999
(86) PCT No.: PCT/FR99/00263
 § 371 Date: Feb. 1, 2000
 § 102(e) Date: Feb. 1, 2000
(87) PCT Pub. No.: WO99/40337
 PCT Pub. Date: Aug. 12, 1999

(30) Foreign Application Priority Data

Feb. 5, 1998 (FR) .................................... 98 01453
Dec. 14, 1998 (FR) .................................... 98 15770

(51) Int. Cl.[7] .................................... F16D 13/75
(52) U.S. Cl. .................................... 192/111 A; 192/70.25
(58) Field of Search .................................... 192/70.25, 70.27, 192/89.23, 111 A (56) References Cited

U.S. PATENT DOCUMENTS 4,228,883 * 10/1980 Palmer .............................. 192/111 A
5,944,157 * 8/1999 Blard et al. ........................ 192/70.12

FOREIGN PATENT DOCUMENTS 2753503 3/1998 (FR) .
2753758 3/1998 (FR) .

* cited by examiner

Primary Examiner—Richard M. Lorence
(74) Attorney, Agent, or Firm—Liniak, Berenato, Longacre & White (57) ABSTRACT

The invention concerns a clutch mechanism comprising a cover (52) including a housing (218) receiving support (62) shaped like an upside down U of the adjustment cassette containing an upper web (64) fixed to a peripheral edge (152) of the cover (52) by riveted plate bracket (68). The invention is characterised in that the support comprises a stabilising bracket (171) vertically supported against an upper edge (158) pertaining to an aperture formed in a vertical transverse wall of the housing (218).

11 Claims, 8 Drawing Sheets

CLUTCH MECHANISM COMPRISING A WEAR TAKE-UP MODULE

BACKGROUND OF THE INVENTION

Field of the Invention

The present invention concerns a friction clutch mechanism, notably for a motor vehicle, and relates more particularly to a clutch equipped with a device for compensating for the wear due notably to the wear on the friction lining or linings, this device, hereinafter referred to as a wear take-up device, operating generally as the wear occurs on the lining or linings.

Description of Related Art

A conventional friction clutch generally has a reaction plate forming part of an engine flywheel, possibly in two parts in order to form a damping flywheel or a flexible flywheel, fixed with respect to rotation to the first shaft, usually a driven shaft such as the crankshaft of the internal combustion engine, and supporting through its external periphery a rear cover to which there is attached, with axial mobility, at least one front pressure plate.

The pressure plate is fixed with respect to rotation to the cover and reaction plate whilst being able to move axially under the action of axially acting engaging means controlled by disengaging means. The engaging means can consist of helical springs or two Belleville washers mounted in series, subjected to the action of disengaging levers forming disengaging means.

Generally, the engaging and disengaging means form part of the same piece, for example a metallic diaphragm bearing on the cover. The diaphragm can be mounted in series or in parallel with a Belleville washer in order to provide assistance for the disengagement force.

A friction disk, carrying friction linings at its external periphery, fixed with respect to rotation to the shaft, usually a driven shaft such as the input shaft of the gearbox, is interposed between the pressure plate and the reaction plate so as to be clamped between them when the clutch is in the engagement position in order to transmit the torque from the driving shaft to the driven shaft.

Conventionally, the friction linings are mounted on an axially elastic support coupled rigidly or elastically to the hub fixed with respect to rotation to the driven shaft. By virtue of this arrangement the friction disc assists the diaphragm during the operation of disengaging the clutch.

In a variant, the support is embedded at its external periphery in a friction lining.

Conventionally, the engaging means, cover and pressure plate form part of the unitary assembly referred to as a friction clutch mechanism.

The engaging means control the axial movement of the pressure plate when they are actuated by a clutch release bearing by means of the disengaging means.

The clutch release bearing can be controlled mechanically, hydraulically, electrically or electro-mechanically. The control can be of the manual, automatic or semi-automatic type.

During the service life of such a clutch, the friction lining or linings and the counter-materials, pressure plate and reaction plate wear, which cause a variation in the axial position of the pressure plate, that of the axially acting engaging means and that of the clutch release bearing, resulting in a variation in the axial clamping force between the friction disc on the one hand and the pressure and reaction plates on the other hand, because of the changes in the operating conditions of the engaging means, and the force necessary for disengaging is affected thereby. By providing such a clutch with a wear take-up device, these drawbacks are avoided, the engaging means, as well as the clutch release bearing, usually in constant abutment on the disengaging means, occupying the same position when the clutch is in the engagement position, which makes it possible to reduce the axial bulk of the friction clutch.

The French patent application No FR-96.11297 filed on Sept. 17, 1996 and published under the number 2 753 503 describes and depicts in FIGS. 21 to 26 a friction clutch mechanism, notably for a motor vehicle, of the type having a rear cover 52, a front pressure plate 51 connected with respect to rotation to the cover 52 while being able to move axially with respect to it, abutment means 14 carried by the pressure plate 51, axially acting engaging means 53 acting between the cover 52 and the support means 14, and a wear take-up device.

The wear take-up device comprises on the one hand means 41 with ramps 56 carrying a set of external teeth 59 and placed between the pressure plate 51 and the abutment means 14 in order to constitute a pressure plate 51, 54 with a variable thickness between its friction face and the abutment means 14 and comprises moreover a unit carried by the cover 52 and which includes a piece 62, secured to the cover 52, forming a support for fixing the unit to the cover 52.

The support 62 is roughly in a U-shape with a top central web 64, in the general form of a horizontal plate, oriented roughly tangentially, and two opposite lateral wings 65, 66, each of which extends vertically downwards in an axially oriented plane perpendicular to the top web and each of which has a hole 61 for rotatably mounting an assembly 67, 63, 60, the piece 62 forming a support having a front fixing lug 68 which extends vertically upwards in a transverse plane perpendicular to the overall axis of the mechanism from a front transverse edge of the plate forming a central web 64 and which is fixed by riveting to a peripheral edge of the cover 52.

The assembly has notably a shaft carrying a worm, a ratchet wheel and a helical spring. The support also carries an elastic member provided on the one hand with a control tongue on the other hand with a non-return catch.

The control tongue is able to be manoeuvred by an actuator forming part of the engaging means of the clutch and cooperates, as does the catch, with the teeth on the ratchet wheel.

The worm cooperates with the teeth on a set of teeth belonging to the ramp means produced in the form of a ring with ramps disposed axially between the support means of the engaging means and the pressure plate. The worm cooperates with this set of teeth and with means of guiding in rotation, comprising the helical spring, which are made operational by the wear on the friction lining when the clutch is engaged. The worm is mounted tangentially with respect to its associated set of teeth.

It is desirable to ensure good holding in the fixed position of the unit by means of its U-shaped support without for that purpose having recourse to additional lugs for fixing by riveting like the lugs 69 illustrated in FIGS. 23 and 25 in this same document.

SUMMARY OF THE INVENTION

To this end, the invention proposes a clutch mechanism of the type mentioned above, characterised in that the support has at least one axially oriented stabilisation lug which extends towards the rear through an opening formed in the cover and riveted by at least one roughly tangentially oriented horizontal abutment edge which constitutes an abutment surface for the stabilisation lug.

By virtue of the invention, the support is simplified since the stabilisation lug replaces the fixing lugs of the prior art. The unit is stable. In addition, by virtue of the opening, it is possible to reduce the bulk because the support enters the opening. This support can thus have greater length whilst being more stable and robust.

According to other Characteristics of the Invention:

- the abutment edge is a bottom edge of the opening and the stabilisation lug is in vertical abutment, through its bottom face, on the bottom horizontal abutment edge in order to have a support of maximum length, which is very stable and compact since it fits within the contour of the opening;
- the bottom horizontal abutment edge is offset radially inwards with respect to the plane of the plate forming the top central web in order to increase still further the stability of the support and of the unit;
- the stabilisation lug extends from a rear transverse edge of the plate forming the top central web in the plane of the latter, and is then angled successively twice so that its rear free end portion extends horizontally in a plane offset radially downwards in order to reduce the bulk to the maximum possible extent and to fit within the contour of the opening;
- the stabilisation lug is a single central lug and the piece forming the support has two returns, arranged transversely opposite each other on each side of the central stabilisation lug and each one of which extends vertically downwards from the rear transverse edge of the plate forming the top central web for a distribution of forces;
- the stabilisation lug extends horizontally towards the rear from a rear vertical edge of one of the lateral wings;
- two opposite stabilisation lugs are provided, each which extends horizontally towards the rear from a rear vertical edge of one of the wings;
- the unit is mounted in a housing in the cover delimited by a rear transversely oriented base, and the said opening is formed partly in the rear transverse base of the housing;
- the said assembly which comprises a worm, cooperating with the set of teeth of the ramp means on which is mounted a transverse shaft, roughly tangentially oriented with respect to the central axis of the mechanism, passing through at least one hole in one of the lateral wings of the support, and which comprises a ratchet wheel secured axially and with respect to rotation to the worm, an elastic take-up means acting on the ratchet wheel, and an elastic member provided with an elastic control tongue carried by a return on the elastic member and provided with a non-return catch which are able to cooperate with the ratchet wheel;
- the piece forming a support is a piece made of cropped and bent sheet metal. By virtue of the invention, it is possible to mount the support in the manner of a drawer in the opening and the elastic control tongue is also simplified.

BRIEF DESCRIPTION OF THE DRAWINGS

Other characteristics and advantages of the invention will emerge from the reading of the detailed description which follows, for an understanding of which reference should be made to the accompanying drawings, in which.

DETAILED DESCRIPTION OF PREFERRED EMBODIMENT

In the following description, identical, similar or analogous elements or components will be designated by the same reference numbers.

In order to simplify the understanding of the description and claims, the terms horizontal, vertical, top, bottom, etc, will be used non-limitatively, notably with reference to the figures.

A description will now be given of the first embodiment illustrated in FIGS. 1 to 4.

These figures depict a clutch equipped with a wear take-up device, of the type described in the French patent application filed on Sep. 17, 1996 under the number 96 11297, to which reference should be made for more details.

Referring to the figures, a friction clutch mechanism can be seen, notably for a motor vehicle, with an axial axis of symmetry X—X, which forms a unitary assembly and which comprises a front pressure plate 51 intended to cooperate with the friction disc, carrying friction linings at its external periphery, and which itself cooperates with a reaction plate. In the bottom part of FIG. 1, there will have been depicted schematically, respectively at 100 the friction disc and at 101 the reaction plate. The reaction plate is intended to be fixed with respect to rotation to a driving shaft, such as the crankshaft of the internal combustion engine. The friction disc 100 is fixed with respect to rotation to a driven shaft such as the input shaft of the gearbox.

Figure 1:
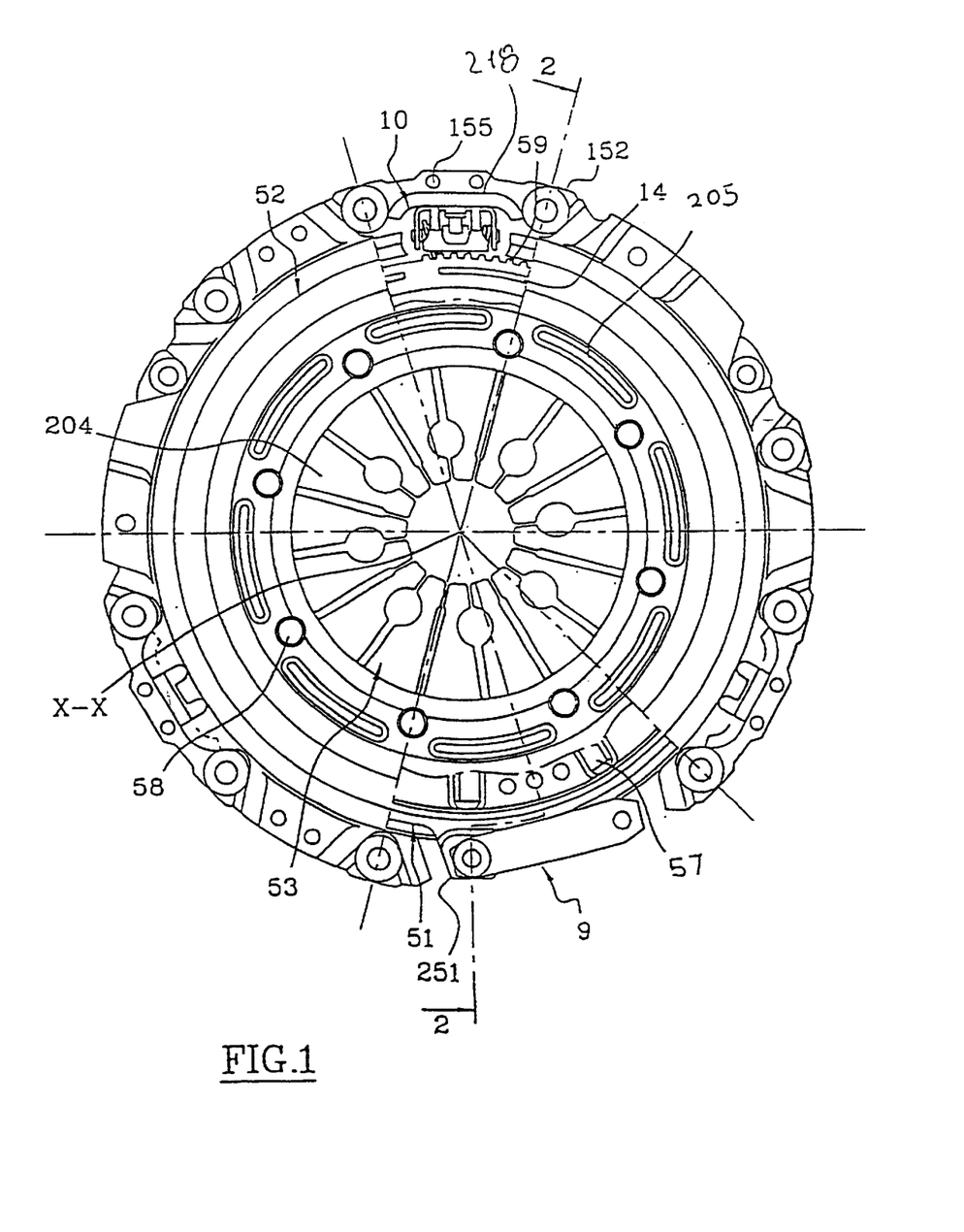
FIG. 1 is a front view of a clutch equipped with a wear take-up device with a unit according to a first embodiment of the invention, with partial cutaways in order to illustrate notably the set of teeth on the ring with ramps and the tangential tongues.

The pressure plate 51 is fixed with respect to rotation to the cover 52 by means of tangential tongues 9, one of which is visible in FIGS. 1 and 2 and which, axially elastic, constitute at the same time means for axially returning the pressure plate 51 towards the rear in the direction of the transverse base 200 of the cover 52. In a variant, the tongues 9 are radially oriented.

Figure 2A:
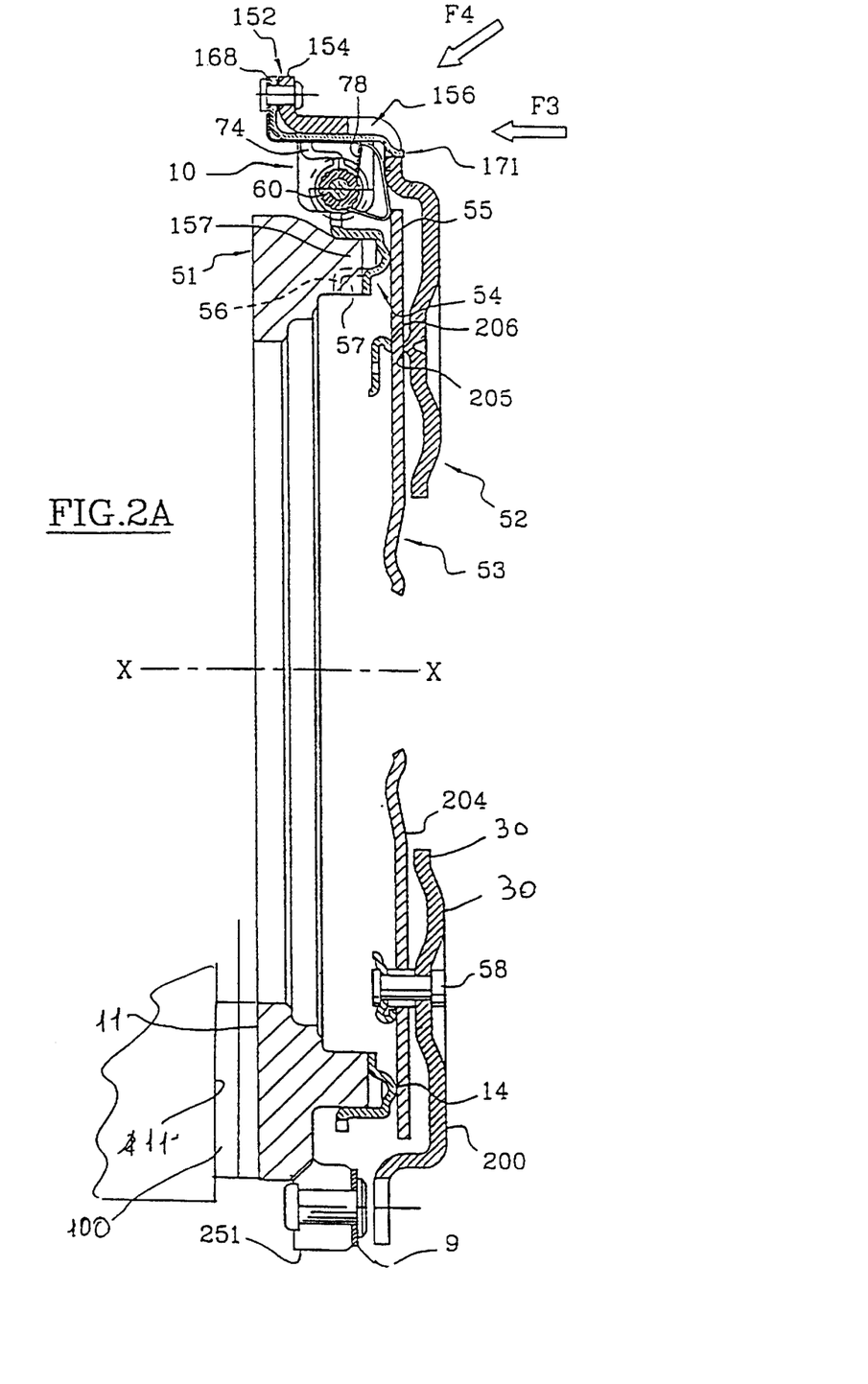
FIG. 2A is a view in section along the line 2—2 in FIG. 1.
Figure 2B:
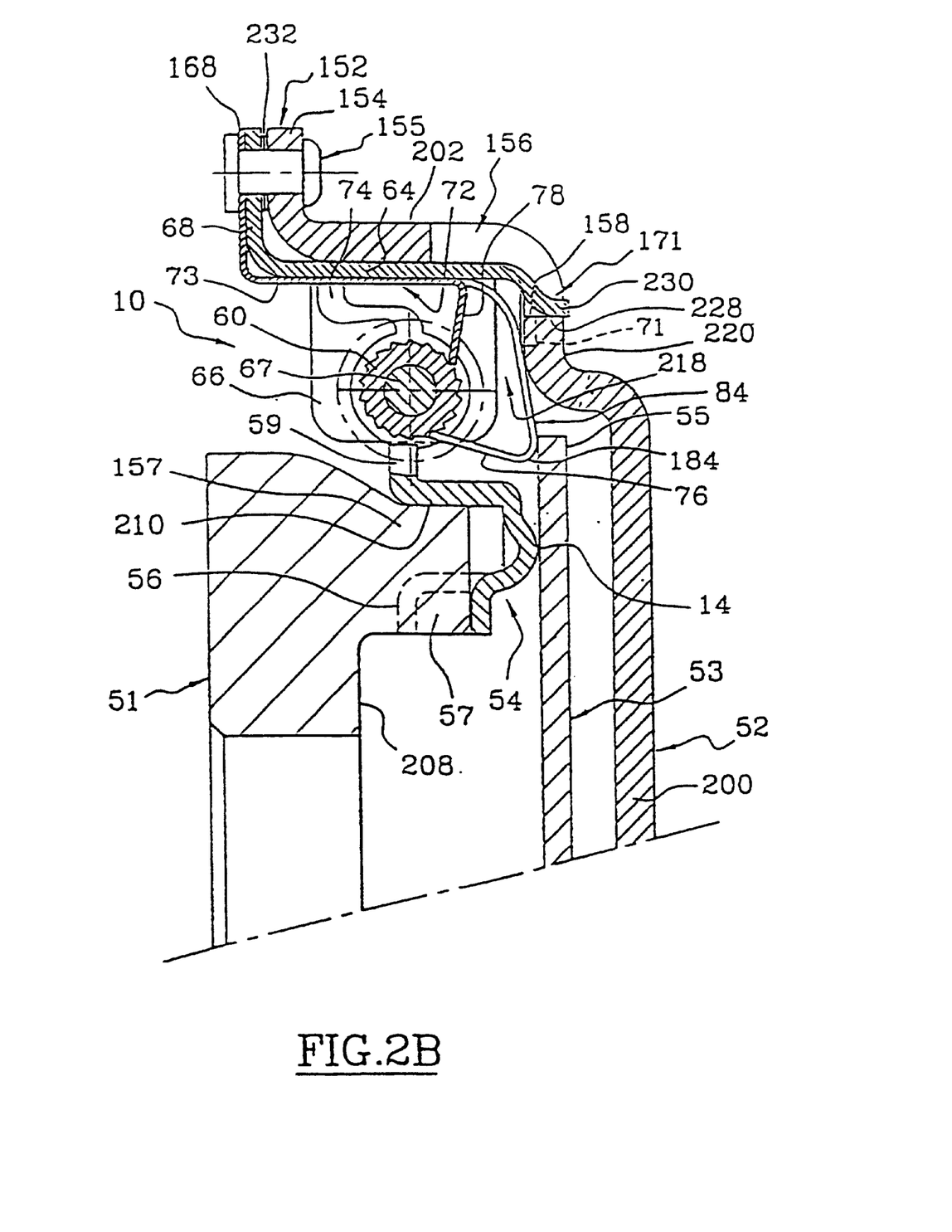
FIG. 2B is a view to a larger scale of the top part of FIG. 2A.

In all cases, the tongues 9 are fixed by riveting at one of their ends to the cover 52 and at the other end to a lug 251 on the pressure plate (FIGS. 2A, 2B).

The tongues 9 allow an axial movement of the pressure plate 51 with respect to the cover 52. The cover is metallic whilst being made of pressed sheet metal whilst the pressure and reaction plates are made of cast iron. This cover 52 has the transversely oriented bottom 200, with a central hole and means 152 for fixing it to a reaction plate, possibly divided in order to form a damping flywheel.

Here the cover 52 is overall in the form of a hollow dish and has at its external periphery a flange 152, roughly transversely oriented, which extends radially outwards in a vertical plane perpendicular to the axis X—X, forming notably the means of fixing the cover 52 to the reaction plate, this flange 152 provided with holes for the passage of members, such as screws, for fixing the cover to the reaction plate 101.

An axially oriented annular skirt connects the base 200 to the flange 152 and is open at the level of the tongues 9.

The reaction plate 101 can be flat or, in a variant, this plate has a skirt to which the flange 152 is fixed so that the cover 52 can be less deep.

The pressure plate 51, whilst being fixed with respect to rotation to the cover 52, is therefore able to move axially with respect to the cover 52 under the action of axially acting engaging means controlled by disengaging means, here a diaphragm 53 mounted so as to be articulated on the cover 52 by virtue of small columns 58 carried by the base 200 of the cover 52 with central hole.

The diaphragm 53, forming axially acting elastic means, has a frustoconical shape in the free state and has a peripheral part in the form of a Belleville washer extended towards the centre by a central part and divided into radial fingers 204 by slots, as can be seen in FIG. 1.

The diaphragm 53 bears, by means of its Belleville washer, on the base 200 of the cover for action on the pressure plate 51 and axial clamping of the friction linings, which the friction disc 100 has, between the pressure and reaction plates.

Here the clutch is of the pushed type, that is to say it is necessary, by means of a clutch release bearing (not shown), controlled manually or semi-automatically or automatically and not depicted, to act by pushing on the inner end of the fingers of the diaphragm 53 in order to disengage (declutch) the clutch. To do this (FIGS. 2A, 2B) the base of the cover 52 carries on the one hand a primary abutment 205 consisting for example of a rod, or here a dished part produced in the base of the cover at the internal periphery thereof, and on the other hand, opposite the primary abutment, a secondary abutment 206 in the form of a rolled ring carried by the small columns 58, or any other means, for example in the form of a tapered washer carried by lugs issuing by cropping and bending from the base of the cover 52 and passing through broadened orifices in the diaphragm like the small columns 58.

The diaphragm 53, through the internal periphery of its Belleville washer, is mounted so as to tilt or pivot between the said primary 204 and secondary 206 abutments. Through the external periphery of its Belleville washer, it is in contact with abutment areas 14, described below. These areas 14, forming abutment means, are carried by the pressure plate 51.

In order, when the clutch is engaged, to keep the axially acting engaging means 53 in an axial position which is independent of the wear on the linings of the friction disc, and to a lesser extent the wear on the pressure 51 and reaction 100 plates, whose faces respectively 11 and 111, referred to as friction faces forming a rubbing track, wear in contact with the linings of the disc 100, a wear take-up device with ramps is provided.

The wear take-up device comprises a unit 10 and ramp means 54 disposed circumferentially.

More precisely, these ramp means 54 consist of a ring made of cropped and pressed sheet metal so as to have circumferentially disposed ramps 56; the said ring also has abutment areas 14 formed by the rounded top edge of pressed parts in the form of arcs of a circle centred on the axis of the clutch and placed radially towards the outside with respect to the ramps 56.

The pressure plate 51 has here, made by moulding, on its rear transverse face 208 turned towards the base 200 of the cover 52, radially beyond the small columns 58, studs 57 distributed circumferentially at a distance from each other which corresponds to that which circumferentially separates two successive ramps 56, the studs 57 being intended each to cooperate with a ramp 56.

The ring 54 with ramps 56 is placed axially between the diaphragm 53 and the pressure plate 51 so that the studs 57 receive the ramps 56 and the diaphragm 53 cooperates with the abutment areas 14, which thus constitute the abutment means, here divided but which as a variant can be continuous, by means of which the diaphragm 53 acts on the pressure plate 51. This arrangement is economical and simple, the ramp means 54 being metallic and obtained by pressing. As a variant the studs 57 are replaced by counter-ramps of the same shape as the ramps 54.

At least one of the abutment areas 14 of the ramp means 54 is extended at its external periphery by a flange 210 parallel to the axis of the clutch, ending in a transverse return, that is to say extending in a plane perpendicular to the axis X—X of the clutch, provided at its external periphery with a set of teeth 59, so that the abutment areas 14 can be continuous and so that the flange is centred by a thicker part 157 on the pressure plate 51, the set of teeth here being in a single piece with means 54 with ramps 56.

It is in each thicker part 157 that the studs 57 are formed. All the thicker parts 157 can participate in the centring of the ring 54 having a continuous flange.

The wear take-up device also comprises a ratchet wheel 60 with inclined teeth fixed to a shaft 67 which also carries a worm 63. The thread and pitch of the worm 63 are adapted to the set of teeth 59. The worm 63 is caused to cooperate with the set of teeth 59 as will be described below. The worm 63 extends tangentially with respect to the set of teeth.

Figure 3:
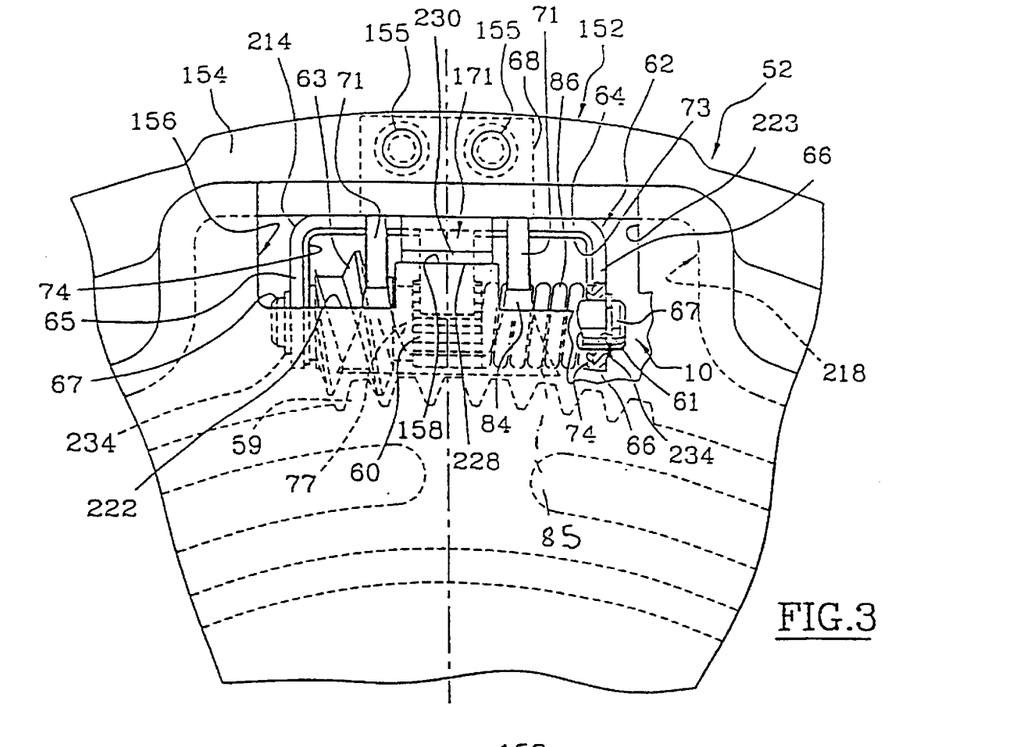
FIG. 3 is a detail view to a larger scale in the direction of the arrow F3 in FIG. 2A, with partial cutaway and a section showing the axial immobilisation of the shaft of the unit.

The shaft 67 of the ratchet wheel 60 is carried rotatively by a support 62, more clearly visible in FIGS. 2A, 2B, 3, made of cropped and bent sheet metal, in the general shape of a U having a horizontal top web 64 in the form of a tangentially oriented plate, and having two opposite lateral wings 65, 66 intended to support the shaft 67. To this end, each of the wings carries a circular hole 61 adapted to receive it.

Each lateral wing extends vertically downwards in a vertical plane parallel to the axis X—X from an axially oriented lateral edge 214 of the plate 64.

The top plate 64 has a front fixing lug 68, in a right-angled shape and directed radially outwards, which is intended to be fixed to an area 154 of the external flange 152 of the cover 52 by two rivets 55.

More precisely, the front lug 68 for fixing by riveting is a single central lug which extends vertically upwards from the front transverse edge 212 of the plate 64 in a transverse plane.

In accordance with the teachings of the invention, complementary means are provided for stabilising the support 62 of the unit 10, which consist here of a stabilisation lug 171. In this way a reduction in the number of fixing lugs and a simplification of the support are achieved.

To this end, the cover 52 has an opening 156 for passage of the stabilisation lug 171 which extends the web 64 axially towards the rear.

More precisely, the unit is arranged in a housing 218 projecting from the cover 52 delimited by a transversely oriented rear base 220. It will be noted that the external periphery of the pressure plate 151 is notched locally for housing the unit 10 and reducing the axial size. Naturally the housing 218 is formed as a thicker part, here by deformation by press, at the level of the area 154 of a flange 152 on the cover 52 in order to mount the unit 10.

The housing 218 is delimited by the area 154 fixed to a centrally oriented web (not referenced), whose end opposite to the area 154 is provided with the opening 156. Here three housings 218 are provided (FIG. 1) and only one is used for housing the unit.

The opening 156 is delimited by a bottom horizontal edge 222 from which there extends a central abutment lug 224 which is radially oriented towards the outside and offset axially towards the front with respect to the transverse base 220 so that its top free end edge 158 constitutes an abutment edge for the facing portion of the bottom face 228 of the free end portion 230 of the stabilisation lug 171.

The opening 156 is also delimited transversely by two vertical and opposite lateral edges 223.

Figure 4:
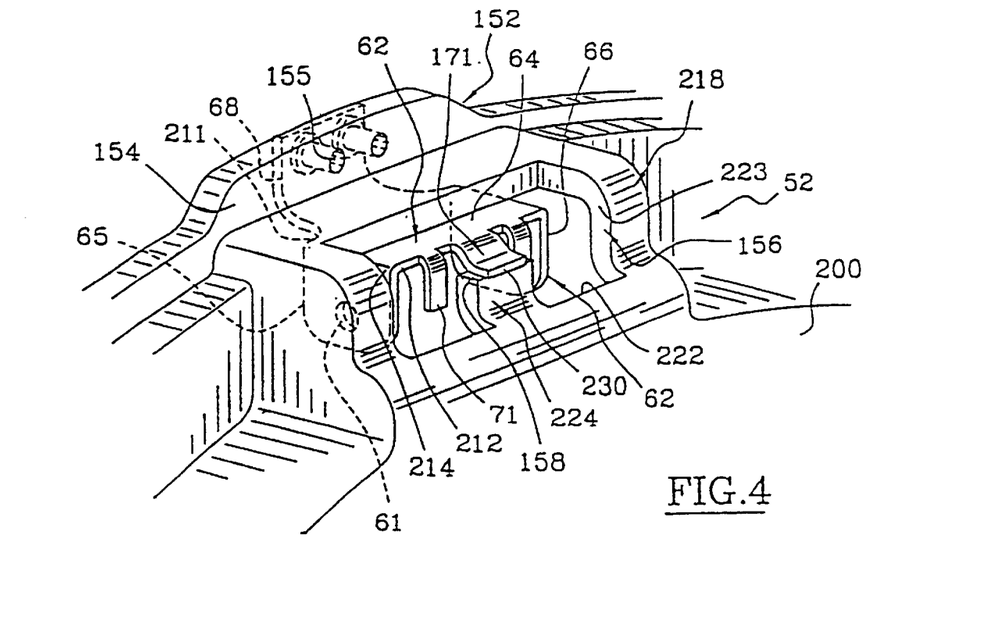
FIG. 4 is a simplified view in perspective and to a larger scale, in the direction of the arrow F4 in FIG. 2A, which illustrates the corresponding part of the cover with the U-shaped support of the unit of the adjustment device.

The stabilisation lug 171 of the embodiment of FIGS. 1 and 4 is angled twice in an S so that the horizontal plane in which its free end portion 230 lies is offset downwards, radially towards the inside, with respect to the plane of the web 64.

Thus the axially oriented web 64 bears on the edge 158 of the opening 156 affecting the base of the cover 52. The stabilisation lug 171 of the web 64 can be fixed to the edge 158 belonging to the base of the cover 52, for example by bonding, welding or crimping.

In the case of fixing by crimping of the lug 171 of the web 64 it is shouldered and passes through a notch produced in the flange 158. After passing through the flange, the lateral ends of the web are crushed hot in order to effect the crimping.

The web 64 of the support 62 has, from its rear transverse edge 212 on the opposite side to the front transverse edge 211 from which the fixing lug 68 extends, two returns 71 extending roughly perpendicularly to the web 64, radially towards the inside in the direction of the axis X—X, and intended to constitute control stops whose role will emerge hereinafter. The ends of the returns 71 are at a sufficient transverse distance from each other to allow, without interfering with it, movement of the actuator 55 during the engagement and disengagement operations.

The actuator 55 consists of a protuberance (or appendage) which the diaphragm 53 has radially projecting at its external periphery.

In practice the returns 71 are made by cropping and bending the web 64 and are thus disposed transversely on each side of the axial lug 171.

The support 62 is thus simple in shape and is stable.

It is much simpler than the one described in the aforementioned document since recourse is not had to any additional lug for fixing by riveting.

By virtue of the invention the number of lugs for fixing to the cover is reduced.

Because of the opening 156 affecting the cover 52 at the area of connection of the skirt of the cover to the base of the cover, welding, bonding or crimping the lug 171 to the edge 158 of the opening is easy. This solution makes it possible to extend the web 64 of the support 62, here made of pressed sheet metal, without increasing the bulk since the support (FIG. 2) is located in the thickness of the cover 52 by means of the opening 154 in the form of a window.

The support 62 is adapted to receive an elastic member 72.

Here the elastic member 72, visible in FIGS. 2A, 2B, is in the shape of a staple and comprises an elongate flat body 73 carrying, at each of its ends, a lateral arm 74 provided with a hole adapted to receive the shaft 67. The two arms 74 are parallel and extend on the same side and roughly perpendicular with respect to the body in the form of a horizontal top plate 73.

On its rear transverse edge, the body 73 is extended in an oblique extension 84 on the same side as the one where the arms 74 are placed.

The free end of the elastic extension 84 is provided with a return 85 in the form of a transverse bar which is extended in a control tongue 76 extending in the direction of the body 74 whilst being roughly parallel to it.

A cutout 77 is provided in the extension 84 and, by means of this cutout 77 and scallops in the body 73, a non-return catch 74 is produced in the form of a blade. The free end of the catch 78 extends roughly perpendicularly to the body 73, that is to say radially inwards.

Here, as can be seen more clearly in FIGS. 2A, 2B, the control tongue 76 and catch 78 are slightly inclined respectively with respect to the plane of the body 73 and to the plane perpendicular to the plane of the body 73.

The catch 78 is offset with respect to the tongue 76, the free ends of the catch 78 and the tongue 76 being offset circumferentially.

A helical compression spring 86 is placed between the ratchet wheel 60 and the free end of the arm 74, whilst being wound around the shaft 67; the worm 63 and ratchet wheel 60 are cut from the same piece.

The ratchet wheel 60 is located between the worm 63 and the spring 86 which constitutes the elastic take-up means. The ratchet wheel 60 is in line with the non-return catch 78 which, by cooperation with the inclined teeth of the ratchet wheel 60, prevents the ratchet wheel 60 from turning, as well as the worm 63 in the anti-clockwise direction, as seen in FIGS. 2A, 2B.

As the support 62 carrying the ratchet wheel 60, worm 63 and helical spring 86 is fixed to the cover 82, the diaphragm 53 moves with respect to it during disengagement and re-engagement operations.

The diaphragm 53 carries at its periphery the radial appendage (or radial protuberance), referred as to an actuator 55, extending radially outside the Belleville washer part of the diaphragm 53 in order to cooperate with the extension 84 of the elastic member 72, or more precisely with a rounded area 184 connecting the main part of the extension 84 to the blade 76.

It will be understood that, by virtue of this arrangement, when the diaphragm 53 tilts during disengagement and re-engagement operations, the actuator 55 moves the extension 84 from right to left, as seen in FIG. 1, and the control tongue 76, by cooperation with the teeth on the ratchet wheel 60, is caused to make the ratchet wheel 60 turn in the clockwise direction and therefore to cause the screw 63 to turn by compressing the spring 86.

When the actuator 55, on return (disengagement operation), is moved from left to right, the elasticity of the extension 84 of the elastic means 72 and the inclination of the teeth mean that the tongue 76 moves towards the right, climbing up the teeth, which are kept fixed with respect to rotation by the non-return catch 78.

The functioning of the clearance take-up device which has just been described is known and will not be detailed. If necessary, reference can be made to the French patent application 96 11 297 already cited, where the corresponding part of the description should be considered to form part of the present application, knowing that, during the disengagement operation, the return travel or cocking of the control tongue 76 is limited by the extension 84, or more precisely the rounded area 184, coming into abutment against the returns 71 on the support 62 which is thicker than the member 72, the role of the return 71 being to preserve the elastic member 72.

Here the worm 63 and ratchet wheel 60 are for example in a single piece through which the shaft 67 carried by the support 62 passes. The shaft 67 passes through the holes 61 in the wings 65 and 66 of the support 62 and the arms 74 have a free end in the form of a washer with a hole in it.

One of the washers 74 is interposed axially between the internal face of the wing 65 and the free end of the worm 63, extending here over less than two turns, here ½s of a turn, whilst the other washer 175 is interposed between the internal face of the wing 66 and the free end of the helical spring 86.

As can be seen in FIG. 3, the shaft 67 which passes through the lateral wings is immobilised axially by means of two split elastic rings 234, also referred to as circlips, which are received in corresponding grooves formed at the opposite ends of the shaft 67.

Thus there is formed, in a unitary manner, a unit 10 which can be handled and transported, having pieces, here all metallic, namely the support 62, the elastic member 72, the helical spring 86, the ratchet wheel 60, the worm 63 and the shaft 67, the elastic member 72 (FIGS. 2A, 2B) having a radially oriented lug 168 pressed against the lug 68 of the support 62. The body 73 is pressed against the web 64. The lug 168 has, like the lug 68, two holes for fixing rivets 155 to pass.

In accordance with one aspect of the invention, a shim of variable thickness 232 can be interposed between the fixing lug 68 and the flange 152, 154 in order to adjust the axial position of the unit 10 in its housing 218 and therefore with respect to the actuator 55 according to the manufacturing tolerances and dimensional scattering of the different components of the clutch mechanism.

Naturally the elastic member 72, here metallic, has a thickness less than that of the support 62 in order to make flexible the catch 78 and the control tongue 76, which can have at its centre a protrusion by virtue of which all the mechanical stresses are taken towards the centre of the tongue 76 so that the tongue 76 is less fragile. This arrangement increases the service life of the tongue 76, the protrusion 76 being a dished part.

The shaft 67 and therefore the single-piece assembly consisting of worm 63 and wheel 60, can be inclined for good contact with the teeth of the set of teeth 59, here in the form of a sector, and the worm. All the solutions described in the document FR 98/01453, whose priority is claimed, can be envisaged and considered to be annexed to the present invention.

Figure 5:
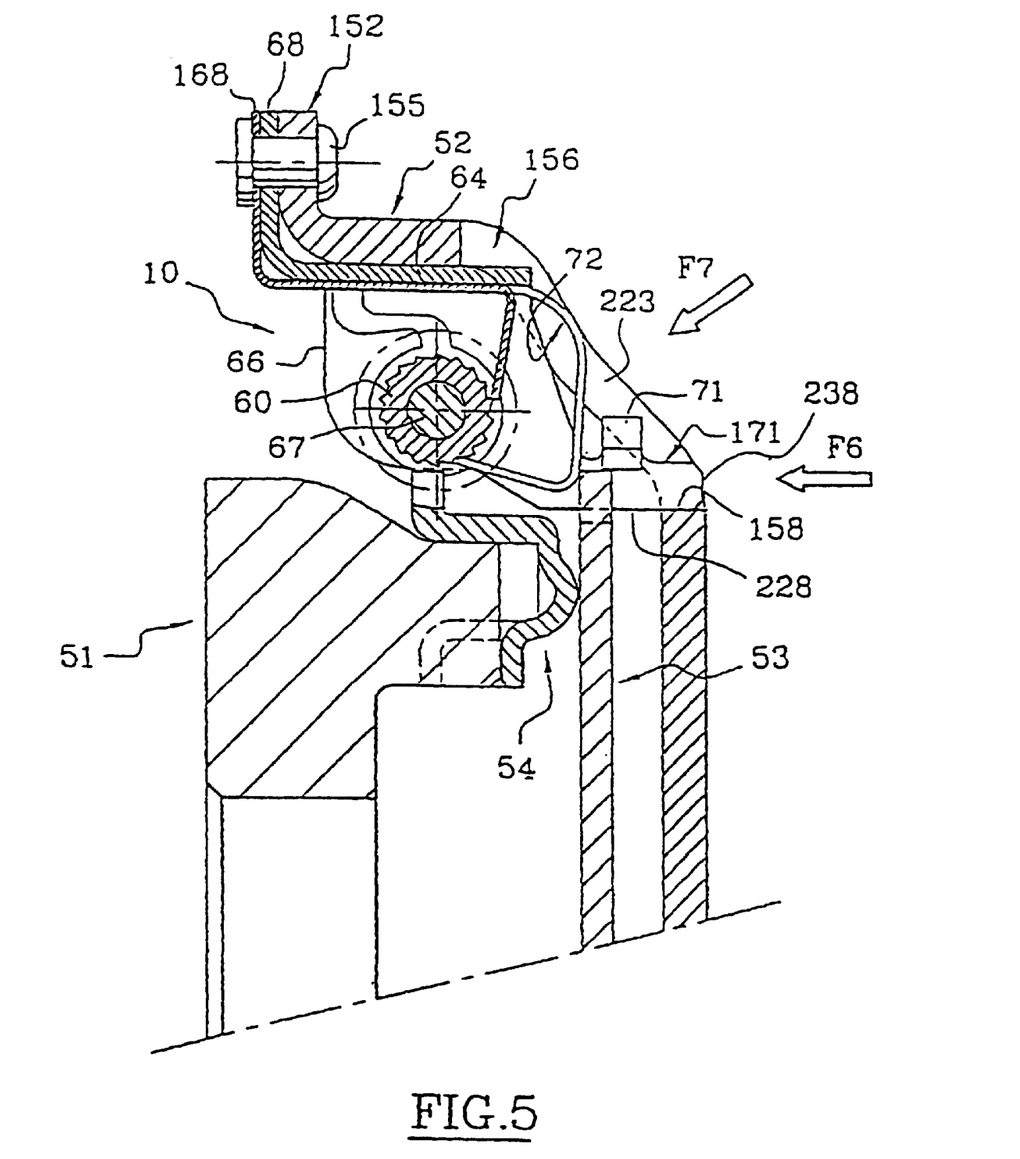
FIG. 5 is a view similar to FIG. 2B which illustrates a second embodiment of the invention.
Figure 6:
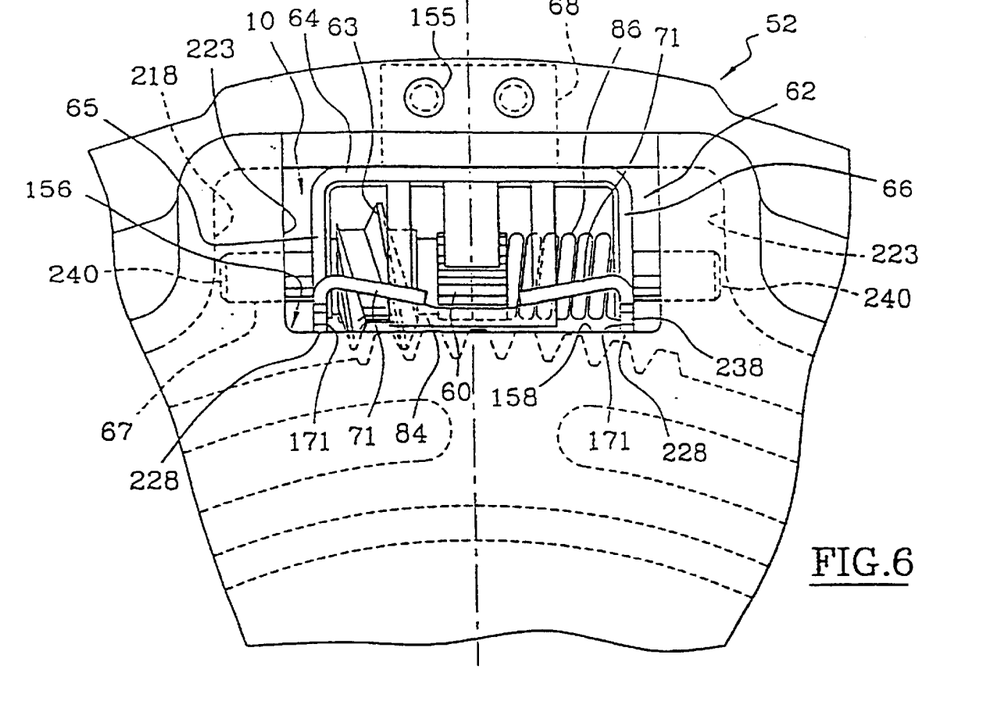
FIGS. 6 and 7 are views similar to FIGS. 3 and 4 which correspond to views in the direction of the arrows F6 and F7 in FIG. 5.
Figure 7:
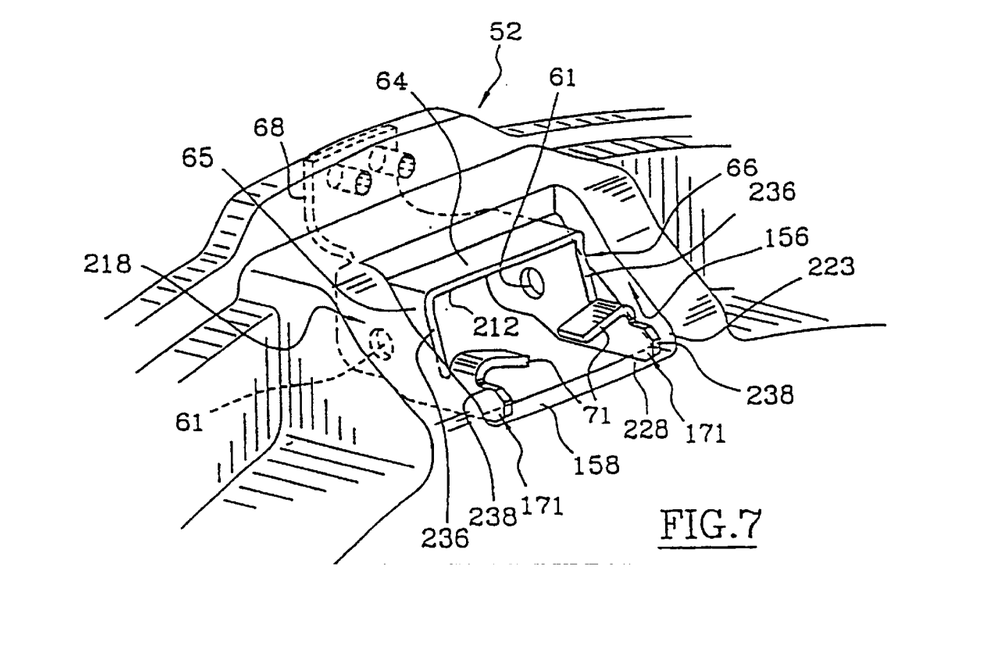

In the second embodiment illustrated in FIGS. 5 to 7, the support 62 of the unit has here two stabilisation lugs 171 which are arranged transversely opposite each other and each one of which extends axially towards the rear from the rear vertical edge 236 of a lateral wing 65, 66 in the vertical plane of the latter.

The free ends 238 of the stabilisation lugs 171 are bevelled and their bottom faces 228 are in vertical abutment against the straight bottom edge 158 of the opening 156 which constitutes the abutment surface for the stabilisation lugs 171.

The returns 71 extend here transversely inwards, each from the axially oriented top edge 238 of a lug 171.

The shaft 67 of the assembly carried by the support 62 is here held in the tangential direction by the vertical lateral faces of the housing 218, as can be seen notably in FIG. 6.

Figure 8:
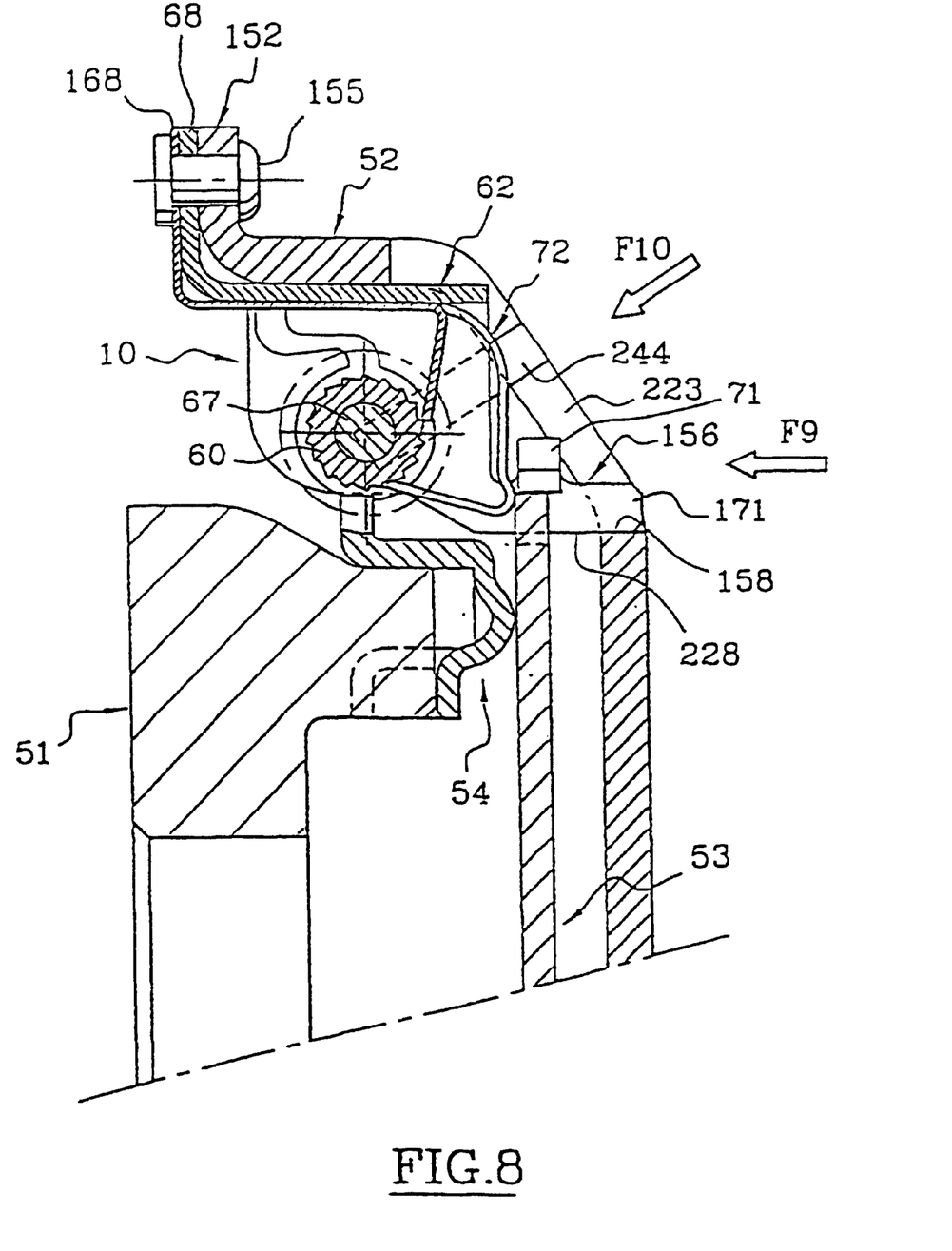
FIGS. 8 to 10 are views similar to FIGS. 5 and 7 which depict a third embodiment of the invention.
Figure 9:
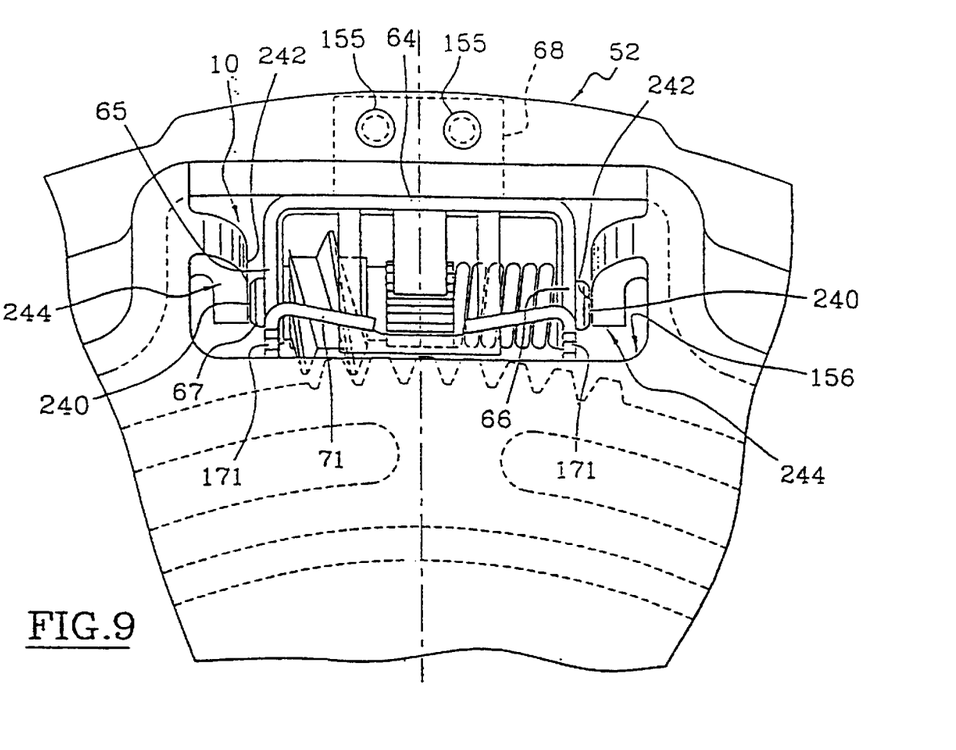
Figure 10:
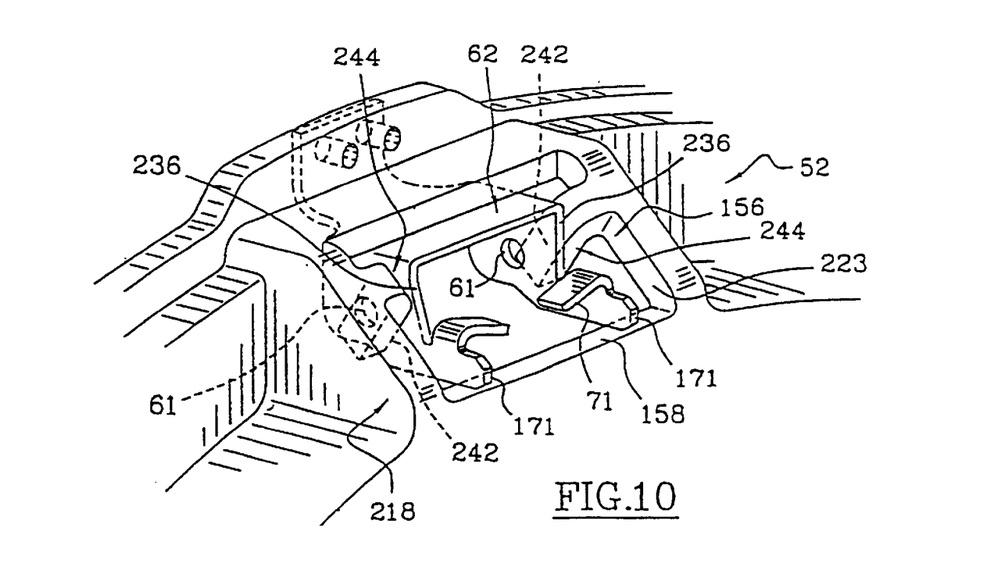

A description will now be given of the third embodiment illustrated in FIGS. 8 to 10, which differs from the second embodiment described previously solely through the means provided for holding the shaft 67 in the transverse direction.

This is because each of the opposite axial ends 240 of the shaft 67 extend opposite a vertically oriented face 242 forming part of an immobilisation lug 244 which is produced in one piece with the cover 52.

More precisely, as can be seen in the figures, each lug 244 extends from a vertical lateral edge 223 of the opening 156, first of all transversely inwards in a tangential direction and is then angled at 90° in order to extend in a vertical plane sloping from rear to front.

The lugs 244 can be produced by cropping, pressing and bending before fitting the unit 10, which makes it possible to use a standard unit 10 for different clutch mechanisms.

The lugs 244 can also be put in their final conformation illustrated in the figures after mounting of the unit 10 in order to immobilise the shaft 67.

The support 62 is very stable in all cases. Naturally, the invention is not limited to the example embodiment described. Thus, as in the document FR 98/11991, the set of teeth 59 may not be in a single piece with the ramp means 54. An intermediate piece fixed axially on the cover 52, for example by means of radial extension of two tongues 9 in the same set, may carry the set of teeth. This piece is connected with respect to rotation to the ramp means, which can move axially with respect to the intermediate piece, for example by means of a cooperation-of-shapes connection or by tongues with the same shape as the tongue 9. By virtue of this arrangement, the presence of a non-return catch is no longer essential. For more information, reference should be made to this document.

Here the base 200 of the cover 52 has at its internal periphery a domed part 300 with an internal periphery in the form of a transversely oriented ring 301. The fingers 204 of the diaphragm 53 have a winding shape at the internal periphery.

Thus, in the storage position, that is to say before mounting the friction clutch mechanism on the reaction plate or a piece secured to the reaction plate, the fingers 204 of the diaphragm come into contact with the ring 301, which preserves the unit.

Here the fingers 204 come into contact with the ring 301 radially beyond their winding shape.

The cover 52 can be of a standard type and serve for a clutch mechanism not provided with a wear take-up device. For this it suffices to remove the domed part.

Naturally, the unit 10 can be protected by providing a support piece which is removed after mounting the mechanism as described in the document FR 98/01769, to which reference should be made for more information.

The unit 10 does not necessarily have elastic take-up means 86. These may act for example between the studs 57 and the ramps 56.

It will be appreciated that the unit is mounted by slipping axially into the housing, before it is fixed.

Naturally, the lug 68 can be omitted. This is because the housing 218 is delimited by a tangentially oriented horizontal top wall 202 whose bottom face constitutes the top abutment face for the web 64 so that it is possible to fix the web 64 by riveting against the bottom face of the wall 202, the said rivets also serving to fix the elastic member 72, thus simplified as described in the document FR/98 15771 filed on 14.12.98.

It will be appreciated that, by virtue of the invention, the elastic member is simplified but has fewer fixing lugs.

What is claimed is:

1. Friction clutch mechanism of the type having a rear cover (52), a front pressure plate (51) connected with respect to rotation to the cover (52) while being able to move axially with respect to it, abutment means (14) carried by the pressure plate (51), axially acting engaging means (53) acting between the cover (52) and the abutment means (14), and a wear take-up device comprising on the one hand means (54) with ramps (56) fixed with respect to rotation carrying an external set of teeth (59) and placed between the pressure plate (51) and the abutment means (14) in order to constitute a pressure plate (51, 54) with a variable thickness between its friction face (11) and the abutment means (14) and comprising on the other hand a unit (10) carried by the cover (52) and which has a piece (62), fixed to the cover (52), forming a support roughly in a U-shape with a top central web (64), in the general shape of a horizontal plate, oriented roughly tangentially, and two opposite lateral wings (65, 66), each of which extends vertically downwards in an axially oriented plane perpendicular to the top web and each of which has a hole (61) for rotably mounting an assembly (67, 63, 60), the piece (62) forming a support having a front fixing lug (68) which extends vertically upwards in a transverse plane perpendicular to the overall axis (X—X) of the mechanism from a front transverse edge (211) of the plate forming a central web (64) and which is fixed by riveting (155) to a peripheral edge (152, 154) of the cover (52), characterised in that the support (62) has at least one axially oriented stabilisation lug (171) which extends towards the rear through an opening (156) formed in the cover (52, 218) and delimited by at least one horizontal abutment edge (158, 222) with a roughly tangential orientation, which constitutes an abutment surface for the stabilisation lug (171).

2. Mechanism according to claim 1, characterised in that the abutment edge (158) is a bottom edge of the opening (156) and in that the stabilisation lug (171) is in vertical abutment, through its bottom face (228), on the bottom horizontal abutment edge (158, 222).

3. Mechanism according to claim 1, characterised in that the bottom horizontal abutment edge (158) is offset radially inwards with respect to the plane of the plate forming the top central web (64).

4. Mechanism according to claim 1, characterised in that the stabilisation lug (171) extends from a rear transverse edge (212) of the plate forming the top central web (64) in the plane of the latter and is then angled successively twice so that its rear free end portion (230) extends horizontally in a plane offset radially downwards.

5. Mechanism according to claim 1, characterised in that the stabilisation lug (171) is a single central lug and in that the piece forming a support has two returns (71), arranged transversally opposite each other on each side of the central stabilisation lug and each of which extends vertically downwards from the rear transverse edge (221) of the plate forming the top central web (64).

6. Mechanism according to claim 4, characterised in that the stabilisation lug (171) extends horizontally towards the rear from a rear vertical edge (236) of one of the lateral wings (65, 66).

7. Mechanism according to claim 6, characterised in that two opposite stabilisation lugs (171) are provided, each of which extends horizontally towards the rear from a rear vertical edge (236) of the one of the lateral wings (65, 66).

8. Mechanism according to claim 1, characterised in that the unit (10, 62) is mounted in a housing (218) of the cover (52) delimited by a transversely oriented rear base (220), and in that the said opening (156) is formed partly in the rear transverse base (220) of the housing (218).

9. Clutch mechanism according to claim 1, characterised in that the said assembly which comprises a worm (63), cooperating with the set of teeth (59) of the ramp means (54) on which is mounted a transverse shaft (67), roughly tangentially oriented with respect to the central axis (X—X) of the mechanism, passing through at least one hole (61) in one of the lateral wings (65, 66) of the support, and which comprises a ratchet wheel (60) secured axially and with respect to rotation to the worm (63), an elastic take-up means (86) acting on the ratchet wheel (60), and an elastic member (72) provided with an elastic control tongue (76) carried by a return on the elastic member (72) and provided with a non-return catch (78) which are able to cooperate with the ratchet wheel (60).

10. Mechanism according to claim 1, characterised in that the piece forming a support (62) is a piece made of cropped and bent sheet metal.

11. Mechanism according to claim 1, characterised in that the set of teeth (59) is in a single piece with the means (54) with ramps (56).

* * * * *